United States Patent
Klotz et al.

(10) Patent No.: US 11,580,793 B2
(45) Date of Patent: Feb. 14, 2023

(54) SENSOR FOR EMITTING SIGNALS AND FOR RECEIVING REFLECTED ECHO SIGNALS, AND SYSTEM INCLUDING A CONTROL UNIT AND SUCH A SENSOR

(71) Applicant: Robert Bosch GmbH, Stuttgart (DE)

(72) Inventors: Albrecht Klotz, Leonberg (DE); Dirk Schmid, Simmozheim (DE); Michael Schumann, Stuttgart (DE); Thomas Treptow, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 561 days.

(21) Appl. No.: 16/605,871

(22) PCT Filed: May 7, 2018

(86) PCT No.: PCT/EP2018/061647
§ 371 (c)(1),
(2) Date: Oct. 17, 2019

(87) PCT Pub. No.: WO2018/206477
PCT Pub. Date: Nov. 15, 2018

(65) Prior Publication Data
US 2021/0125429 A1 Apr. 29, 2021

(30) Foreign Application Priority Data
May 8, 2017 (DE) .......................... 102017207680.1

(51) Int. Cl.
*G07C 5/08* (2006.01)
*G01S 7/00* (2006.01)
(Continued)

(52) U.S. Cl.
CPC ............ *G07C 5/0808* (2013.01); *G01S 7/003* (2013.01); *G01S 7/52004* (2013.01);
(Continued)

(58) Field of Classification Search
CPC ... G07C 5/0808; G01S 7/003; G01S 7/52004; G01S 15/931; G01S 2013/9324; G08C 23/04; H04L 12/40; H04L 2012/40215
See application file for complete search history.

(56) References Cited

U.S. PATENT DOCUMENTS

2004/0074295 A1* 4/2004 Michalski ............. G01F 23/284
73/290 R
2007/0070814 A1* 3/2007 Frodyma ............. G01S 7/52004
367/134
(Continued)

FOREIGN PATENT DOCUMENTS

DE 102009049067 A1 4/2011
DE 102010044991 A1 3/2012
(Continued)

OTHER PUBLICATIONS

English translation of DE102015109155A1 (Year: 2015).*
(Continued)

*Primary Examiner* — Ernest G Tacsik
(74) *Attorney, Agent, or Firm* — Norton Rose Fulbright US LLP; Gerard Messina

(57) ABSTRACT

A sensor, including at least one transducer for emitting signals and for receiving reflected echo signals, the transducer being set up to output an analog measuring signal, an analog-to-digital converter for converting the analog measuring signal into a digital measuring signal, an evaluation unit for evaluating the digital measuring signal, and a communication unit for transmitting a measuring result of the evaluation via a digital communication interface. The communication unit is equipped to receive a request for diagnostic data via the digital communication interface, and is also equipped to switch the sensor to diagnostic operation and to transmit requested diagnostic data via the digital communication interface. The communication unit is set up to communicate with at least two different data rates via the digital communication interface, a higher data rate being used for transmitting the diagnostic data than for transmitting the measuring result during normal operation of the sensor.

11 Claims, 2 Drawing Sheets

(51) Int. Cl.
*G01S 7/52* (2006.01)
*G01S 13/931* (2020.01)
*G01S 15/931* (2020.01)
*G08C 23/04* (2006.01)
*H04L 12/40* (2006.01)

(52) U.S. Cl.
CPC .......... *G01S 13/931* (2013.01); *G01S 15/931* (2013.01); *G08C 23/04* (2013.01); *H04L 12/40* (2013.01); *G01S 2013/9324* (2020.01); *H04L 2012/40215* (2013.01)

(56) References Cited

U.S. PATENT DOCUMENTS

| | | | | |
|---|---|---|---|---|
| 2014/0005881 | A1* | 1/2014 | Hardesty | G07C 5/0808 701/32.8 |
| 2015/0260833 | A1 | 9/2015 | Schumann et al. | |
| 2015/0260841 | A1* | 9/2015 | Kuo | G01S 13/34 342/70 |
| 2018/0017672 | A1* | 1/2018 | Warke | G01S 7/526 |
| 2018/0219878 | A1* | 8/2018 | Hirshberg | H04L 67/12 |

FOREIGN PATENT DOCUMENTS

| | | | |
|---|---|---|---|
| DE | 102011121092 | A1 | 6/2013 |
| DE | 102013226376 | A1 | 6/2015 |
| DE | 102014110187 | A1 | 1/2016 |
| DE | 102014118566 | A1 | 6/2016 |
| DE | 102015109155 | A1 * | 12/2016 |
| DE | 102015109155 | A1 | 12/2016 |
| JP | 2006010446 | A | 1/2006 |
| JP | 2009265075 | A | 11/2009 |
| JP | 2017078710 | A | 4/2017 |

OTHER PUBLICATIONS

International Search Report for PCT/EP2018/061647, dated Aug. 3, 2018.

Kent Lennartsson, "Comparing CAN FD With Classical CAN", 2016, pp. 1-8, XP055495349.

* cited by examiner

SENSOR FOR EMITTING SIGNALS AND FOR RECEIVING REFLECTED ECHO SIGNALS, AND SYSTEM INCLUDING A CONTROL UNIT AND SUCH A SENSOR

FIELD

The present invention relates to a sensor including at least one transducer for emitting signals and for receiving reflected echo signals, the transducer being set up to output an analog measuring signal, an analog-to-digital converter for converting the analog measuring signal into a digital measuring signal, an evaluation unit for evaluating the digital measuring signal, and a communication unit for transmitting a result of the evaluation via a digital communication interface. A further aspect of the present invention relates to a system including a control unit and such a sensor, the control unit and the at least one sensor being connected to each other via a digital communication interface.

BACKGROUND INFORMATION

Modern vehicles have a multitude of sensors, via which information is obtained about the area surrounding the vehicle. To ensure reliable operation of the vehicle systems, which rely on the data obtained, it is desirable to be able to check the utilized sensors after they have been installed in the vehicle, as well.

German Patent Application No. DE 10 2011 121 092 A1 describes an ultrasonic sensor for a motor vehicle, which is furnished with a communication connector to a data line of the motor vehicle. The sensor is able to be switched into a test mode, and in the test mode, is set up to output the test signal at the communication connector, bypassing the customary communication unit. In this case, the fact is utilized that ultrasonic sensors have a multitude of internal ports, referred to as debug ports, via which various signals of the sensor are able to be picked off during production, among them being a stored threshold-value curve, the receive signal of the sensor or the profile of a receive amplification. The ports are available internally in the sensor, so that in the installed state, they are no longer reachable without damaging it. The test signals are output via the communication connector of the sensor, without being converted into the communication protocol.

The conventional design approaches in the related art require the provision of further diagnostic techniques for checking the sensor, in order to evaluate the analog signals output by the sensor in the test mode.

SUMMARY

In accordance with an example embodiment of the present invention, a sensor is provided, which includes at least one transducer for emitting signals and for receiving reflected echo signals, the transducer being set up to output an analog measuring signal. The sensor also includes an analog-to-digital converter for converting the analog measuring signal into a digital measuring signal, an evaluation unit for evaluating the digital measuring signal, and a communication unit for transmitting a measuring result, produced by the evaluation unit, via a digital communication interface. The communication unit is equipped to receive a request for diagnostic data via the digital communication interface, and is also equipped to switch the sensor to diagnostic operation and to transmit requested diagnostic data via the digital communication interface. In this context, the communication unit is set up to communicate with at least two different data rates via the digital communication interface, a higher data rate being used for transmitting the diagnostic data during diagnostic operation than for transmitting the measuring result during normal operation of the sensor.

In addition to the transducer, the example sensor according to the present invention also includes the electronics necessary for controlling the transducer, the electronics necessary for evaluating the received measuring signals, as well as the components necessary to permit transmission of the measuring result digitally via a digital communication interface. For example, such digital communication interfaces are implemented as bus systems, the LIN (Local Interconnect Network) bus as well as the CAN (Controller Area Network) bus typically being employed in connection with vehicles, for instance. Communication may be carried out with different data rates with these data buses.

During normal operation of the sensor, only the measuring results are transmitted via the digital communication interface. For example, the measuring result may be a value table which indicates at what distances the sensor has detected objects or obstacles. This value table in comparison to the digital measuring signal, for instance, which represents the basis for the digital evaluation by the evaluation unit, has only a very small volume of data, so that even at a low data rate, transmission of the measuring result via the digital communication interface may be concluded quickly. Operation of the communication interface with a higher data rate, which generally is accompanied by an increased energy demand and an increased susceptibility to faults, is therefore not necessary during normal operation.

In diagnostic operation of the sensor, diagnostic data is selected as a function of a request and transmitted via the digital communication interface. The volume of data to be transmitted via the digital communication interface thereby increases considerably. It is therefore provided to operate the digital communication interface with a higher data rate while the sensor is in diagnostic operation. Thus, larger quantities of data may also be transmitted and/or the data transmitted may be updated more frequently.

Preferably, the diagnostic data includes the digital measuring signal. Furthermore, the diagnostic data may additionally or alternatively include an envelope curve of the digital measuring signal and/or an IQ demodulation of the digital measuring signal. The digital measuring signal is the starting point for the subsequent digital evaluation and represents the earliest digital access possibility to the signals received from the sensor. Without an analog-to digital conversion, the analog measuring signal provided directly by the transducer is not suitable for transmission via the digital communication interface. An envelope curve of the digital measuring signal may be obtained, for example, by rectifying and smoothing the digital measuring signal.

Preferably, the digital measuring signal is processed by the evaluation unit with a filter. The diagnostic data then preferably includes a filtered digital measuring signal.

Preferably, the evaluation unit is equipped to correlate the digital measuring signal with a reference signal, in doing so, a correlated signal being generated. In this case, the diagnostic data preferably includes data which is selected from the reference signal, the amplitude of the correlated signal, a measure for the agreement of the phase relations between the reference signal and the digital measuring signal, or a combination of at least two of these items of data.

Preferably, the evaluation unit is equipped to recognize local maxima in the digital measuring signal, in a correlated signal or in a filtered digital measuring signal, the diagnostic data including parameters concerning the recognized maxima. For example, these parameters are selected from the amplitude, phase, time or a combination of at least two of these parameters assigned to the recognized maxima.

The diagnostic data preferably includes sensor parameters. In addition, the communication unit is set up preferably to receive configuration data and to configure sensor parameters as a function of the configuration data. By preference, the sensor parameters are selected from an amplification curve, a threshold-value curve, a transmit frequency, a transmit waveform, a sample rate of the analog-to-digital converter, a sample rate of the digital-to-analog converter, parameters of the filter or a combination of at least two of these sensor parameters.

The amplification curve describes how the analog measuring signal output by the transducer is amplified prior to and/or after the analog-to-digital conversion. In this context, in particular an analog amplifier may be provided which amplifies the analog measuring signal, output by the transducer, prior to the analog-to-digital conversion. In particular, the amplification curve may also be time-dependent.

For example, it is thereby possible to amplify a received echo signal to varying degree depending on the period of time elapsed since the signal was emitted.

For instance, a threshold-value curve may be predetermined as a criterion for determining portions of the echo signal within the received echo signal which stem from a reflection of the emitted signal at an obstacle. In this case, specifically it may be provided that upon recognition of an amplitude of the digital measuring signal above the threshold-value curve, the presence of an obstacle is inferred. At the same time, in particular it may also be provided that the threshold-value curve is time-dependent, that is, the threshold value predefined by the threshold-value curve is a function of the time which has elapsed since the signal was emitted.

The signal emitted by the transducer may be influenced via the following sensor parameters: transmit frequency and/or transmit waveform. In this context, the transmit waveform may be selected as desired, with a sinusoidal signal being able to be specified as the simplest transmit waveform. In this case, the transmit frequency represents the frequency of the sinusoidal signal.

Further sensor parameters may relate to operating parameters of the analog-to-digital converter like, in particular, the sample rate. The sample rate indicates how frequently the analog measuring signal is sampled by the analog-to-digital converter in order to generate the digital measuring signal.

Preferably, the digital communication interface is implemented as a CAN bus, a PSI5 (Peripheral Sensor Interface 5) interface, a point-to-point connection or a LIN bus. In particular, in this context, a point-to-point connection may be set up based on one of the indicated bus types. Accordingly, the communication unit of the sensor is equipped to communicate via the corresponding communication interface.

If the digital communication interface is implemented as a CAN bus, a low data rate of 125 kbit/s may be used in normal operation, for example, and an increased data rate of 1 Mbit/s may be used to transmit diagnostic data.

Preferably, the sensor takes the form of an ultrasonic sensor or radar sensor. If the sensor is implemented as an ultrasonic sensor, then the transducer is a sound transducer which is equipped to emit sound signals and, conversely, to receive sound signals in the form of echoes.

A further aspect of the present invention is to provide an example system including a control unit and at least one sensor. The sensor is formed preferably as described, and both the control unit and the at least one sensor are connected to each other via a digital communication interface. In this context, the control unit is equipped to request and to evaluate diagnostic data from the at least one sensor.

In particular, the control unit is set up to communicate with various data rates via the digital communication interface, a higher data rate being used for transmitting diagnostic data which a sensor transmits during diagnostic operation, than for receiving data, especially measuring results, during normal operation of the at least one sensor.

In order to diagnose problems of the sensor, in particular, reference data may be stored in the control unit, and the control unit may be designed, namely, to compare received diagnostic data with the stored reference data, and upon recognition of deviations, to infer a fault in the sensor.

The example sensor of the present invention as well as the example system of the present invention are set up to transmit not only fully processed measuring results from a sensor to a control unit during diagnostic operation, but also intermediate results which are available, for instance, in the form of a digital measuring signal, a filtered digital measuring signal or as a correlated signal, so that the behavior of the sensor may be checked. Since the volume of data transmitted increases due to the transmission of the diagnostic data, it is provided advantageously to use a higher data rate when transmitting the diagnostic data during diagnostic operation than when transmitting measuring data during normal operation of the sensor.

However, the transmission at a higher data rate causes a higher demand for energy, as well as usually a higher susceptibility to faults during the data transmission. Advantageously, in the case of the sensor of the present invention as well as the system of the present invention, the high data-transmission rate is used only when a higher transmission capacity is needed because of the increase in data volume owing to the diagnostic data.

Compared to the output of analog measured values at the communication interfaces of the sensor known from the related art, the design approach proposed has the advantage that no additional components are necessary for the evaluation. External analog-to-digital converters for acquiring analog test signals are not necessary. Advantageously, the same infrastructure in the form of the digital communication interface is used for transmitting the diagnostic data as for transmitting the measuring results during normal operation of the sensor. Therefore, absolutely no additional measures are necessary in the case of the cabling and in the case of the connections of the sensor.

It is also advantageous that no structural changes would have to be made to a control unit which is intended additionally to permit diagnosis of a sensor. The diagnostic data may be received via the same digital communication interface and may subsequently be evaluated digitally in the control unit. Since as a rule, processors or microcontrollers are present in control units in any case, no further components must be provided for that purpose.

The functioning of a sensor may be diagnosed quickly and easily using the example sensor and system according to the present invention, respectively.

BRIEF DESCRIPTION OF THE DRAWINGS

An exemplary embodiment of the present invention is shown in the figures and explained in greater detail below.

DETAILED DESCRIPTION OF EXAMPLE EMBODIMENTS

Figure 1:
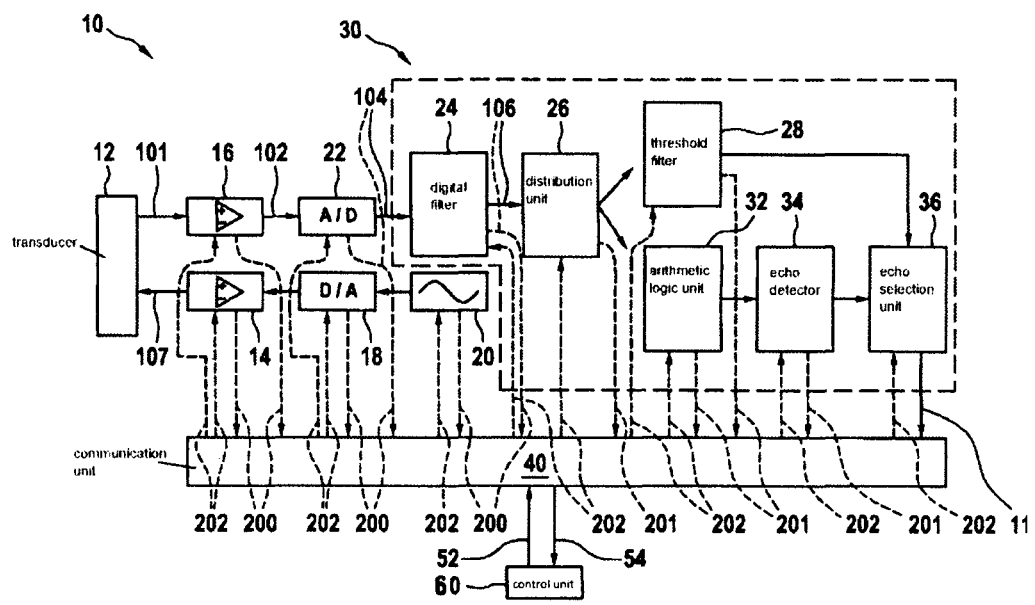
FIG. 1 shows a schematic representation of a sensor.

In the description below of the exemplary embodiments of the present invention, identical components and elements are denoted by identical reference numerals, a repeated description of these components or elements being omitted in individual cases. The figures represent the subject matter of the present invention only schematically.

FIG. 1 shows a sensor 10 which includes a transducer 12, an evaluation unit 30 and a communication unit 40.

Transducer 12 is set up, upon receiving an analog transmit signal 107, to emit a signal. In the case of a sensor 10 in the form of an ultrasonic sensor, transducer 12 is a sound transducer, so that in response to receiving analog transmit signal 107, it emits a sound signal. In order to generate analog transmit signal 107, sensor 10 includes a signal generator 20, a digital-to-analog converter 18 as well as a transmit amplifier 14. Signal generator 20 generates a digital transmit waveform, which is passed on in digital form to digital-to-analog converter 18. It thereupon generates an analog signal which, after amplification by transmit amplifier 14, is output as analog transmit signal 107.

Received signals are output in the form of an analog measuring signal 101 by transducer 12. However, in order to be processed in evaluation unit 30, it is necessary that analog measuring signal 101 be converted in advance into a digital measuring signal 104. To that end, a preamplifier 16 as well as an analog-to-digital converter 22 are disposed between transducer 12 and evaluation unit 30. Analog measuring signal 101 is preamplified and conditioned by preamplifier 16 and forwarded in the form of an amplified analog measuring signal 102 to analog-to-digital converter 22. After the conversion, digital measuring signal 104 is passed on to evaluation unit 30.

In the exemplary embodiment shown in FIG. 1, evaluation unit 30 includes a digital filter 24, a threshold filter 28, an arithmetic logic unit 32, an echo detector 34 as well as an echo selection unit 36. For example, digital filter 24 may be implemented as an optimum filter or matched filter. In that case, a basically known structure of an anticipated receive signal is used to separate useful signals from noise. A filtered digital measuring signal 106 is subsequently forwarded by digital filter 24 to a distribution unit 26. There, filtered digital measuring signal 106 is passed on to threshold filter 28 and arithmetic logic unit 32. For example, in threshold filter 28, filtered digital measuring signal 106 may be compared to a threshold value, signals having an amplitude below the threshold value being discarded. The signals not discarded are transmitted to echo selection unit 36. In arithmetic logic unit 32, filtered digital measuring signal 106 is normalized and the coefficient of correlation is calculated as a function of time. The results of arithmetic logic unit 32 are forwarded to echo detector 34. In echo detector 34, those signal portions in the conditioned results are selected which come from a reflection of an obstacle or an object. The results of echo detector 34 are subsequently passed on to an echo selection unit 36.

Figure 2:
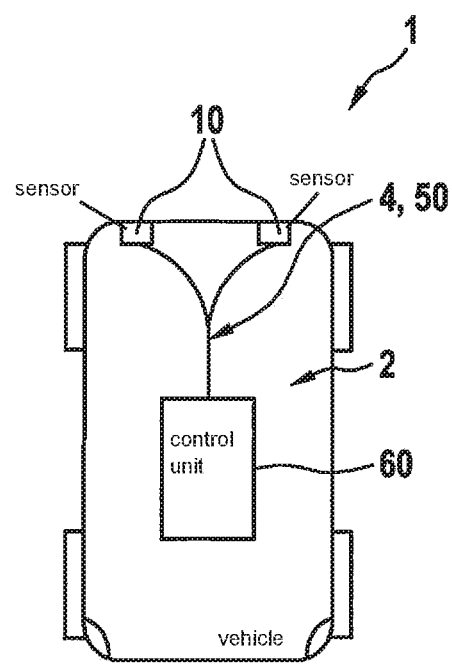
FIG. 2 shows a schematic representation of a vehicle having a system including a control unit and two sensors.

Echo selection unit 36 selects the data to be passed on as measuring result 110, and if desired, measuring results 110 are formatted here, as well, so that they conform to the format which a control unit expects, see FIG. 2. In addition, double echoes, thus, echoes which were ascertained both by echo detector 34 and by threshold filter 28, are merged by echo selection unit 36, so that only one measuring result is transmitted.

Measuring result 110 is subsequently forwarded to communication unit 40. As can be seen in the representation in FIG. 1, communication unit 40 is connected not only to echo selection unit 36, but also has connections to all other components of evaluation unit 30 as well as to signal generator 20, analog-to-digital converter 22, preamplifier 16, digital-to-analog converter 18, and transmit amplifier 14.

Upon receiving a request 52, it is possible for communication unit 40 to compile diagnostic data 54 via these additional connections and to send it via a digital communication interface. In this instance, the digital communication interface is used not only during diagnostic operation of sensor 10, but is also used to transmit measuring results 110 during normal operation of sensor 10.

Request 52 may also include configuration data, whereupon sensor parameters which are necessary to operate the individual components of sensor 10 may be written by communication unit 40. Conversely, communication unit 40 is equipped to read out the sensor parameters again. In the representation in FIG. 1, the reading of parameters is marked with reference numeral 200. The writing of parameters is marked with reference numeral 202.

In addition, it can be seen in FIG. 1 that communication unit 40 receives digital measuring signal 104 from analog-to-digital converter 22, that communication unit 40 receives filtered digital measuring signal 106 from digital filter 24, and that communication unit 40 also receives the results of the further components of evaluation unit 30. Each of these connections is marked with a dashed arrow having reference numeral 201.

Communication unit 40 of sensor 10 is thus able to pick off all digitally existing intermediate results that lead to measuring result 110, and upon receiving a request 52, to transmit them as diagnostic data 54 via the digital communication interface, see FIG. 2. In addition, communication unit 40 is equipped to read out and to rewrite operating parameters, especially of amplifiers 14, 16, of digital-to-analog converter 18, of analog-to-digital converter 22, as well as of signal generator 20.

In this context, the individual components of sensor 10 may be realized at least partly in a single physical unit. For example, the individual units of evaluation unit 30 may be realized in the form of a computer-program product which is executed on a programmable computer device such as a microcontroller, for instance. Alternatively, evaluation unit 30 could also be implemented as an ASIC (Application Specific Integrated Circuit).

FIG. 2 shows a vehicle 1 which contains a system 2 including a control unit 60 as well as two of sensors 10 described with reference to FIG. 1. The two sensors 10 are connected to control unit 60 via a digital communication interface 50, which is realized as CAN bus 4, for example.

To perform a diagnostic, control unit 60 may send a request 52 via CAN bus 4 to one of sensors 10, whereupon it switches over from normal operation to diagnostic operation. Therefore, an increased data rate is used for the further transmission of data. Respective sensor 10 then sends diagnostic data 54, whose composition and content are a function of request 52 transmitted previously, to control unit 60. Control unit 60 may then evaluate received diagnostic data 54 and possibly compare it to reference data. If deviations from the reference data are recognized, a defect in respective sensor 10 may be inferred.

The present invention is not limited to the exemplary embodiments described here and the aspects highlighted therein. Rather, a multiplicity of modifications which lie within the course of activity of one skilled in the art are possible within the scope of the present invention. In particular, the form of evaluation unit 30 may be adapted to the requirements of specific sensor 10, as well.

What is claimed is:

1. A sensor, comprising:
at least one transducer configured to emit signals and to receive reflected echo signals, the transducer being configured to output an analog measuring signal;
an analog-to-digital converter configured to convert the analog measuring signal into a digital measuring signal;
processing circuitry, wherein the processing circuitry is configured to evaluate the digital measuring signal; and
a communication unit configured, during normal operation of the sensor, to transmit a measuring result, produced by the processing circuitry, via a digital communication interface implemented as a CAN bus, the communication unit being configured to receive a request for diagnostic data via the digital communication interface, and also being configured to switch the sensor to diagnostic operation and to transmit requested diagnostic data via the digital communication interface during diagnostic operation,
wherein the communication unit is configured to communicate with at least two different data rates via the digital communication interface, a data rate used for transmitting the diagnostic data being higher than a data rate for transmitting the measuring result during normal operation of the sensor,
wherein the data rate for transmitting the measuring result during normal operation of the sensor is approximately 125 kbit/s, and the data rate used for transmitting the diagnostic data is approximately of 1 Mbit/s,
wherein the higher data rate is used only when a higher transmission capacity is needed.

2. The sensor as recited in claim 1, wherein the diagnostic data includes the digital measuring signal, and/or an envelope curve of the digital measuring signal, and/or an IQ demodulation of the digital measuring signal.

3. The sensor as recited in claim 1, wherein the digital measuring signal is processed by the processing circuitry with a digital filter, the diagnostic data including a filtered digital measuring signal.

4. The sensor as recited in claim 1, wherein the processing circuitry is configured to correlate the digital measuring signal with a reference signal, a correlated signal being generated, and the diagnostic data including data which is selected from: (i) the reference signal, (ii) an amplitude of the correlated signal, or (iii) a measure for agreement of phases between the reference signal and the digital measuring signal, or including a combination of at least two of (i)-(iii).

5. The sensor as recited in claim 1, wherein the processing circuitry is configured to recognize local maxima in the digital measuring signal, in a correlated signal, or in a filtered digital measuring signal, the diagnostic data including parameters concerning the recognized maxima.

6. The sensor as recited in claim 1, wherein the diagnostic data includes sensor parameters.

7. The sensor as recited in claim 1, wherein the communication unit is configured to receive configuration data and to configure sensor parameters as a function of the configuration data.

8. The sensor as recited in claim 1, wherein the digital communication interface is implemented as CAN (Controller Area Network) bus, a PSI5 (Peripheral Sensor Interface 5) interface, a current-modulated point-to-point connection, or a LIN (Local Interconnect Network) bus.

9. The sensor as recited in claim 1, wherein the sensor is an ultrasonic sensor or radar sensor.

10. The sensor as recited in claim 3, wherein the communication unit is configured to receive configuration data and to configure sensor parameters as a function of the configuration data, and wherein the sensor parameters are selected from: (i) an amplification curve, (ii) a threshold-value curve, (iii) a transmit frequency, (iv) a transmit waveform, (v) a sample rate of the analog-to-digital converter, (vi) a sample rate of the digital-to-analog converter, or (vii) parameters of the digital filter, or a combination of at least two of (i)-(vii).

11. A system, comprising:
a control unit; and
at least one sensor, the control unit and the at least one sensor being connected to each other via a digital communication interface implemented as a CAN bus, the at least one sensor including at least one transducer configured to emit signals and to receive reflected echo signals, the transducer being configured to output an analog measuring signal, an analog-to-digital converter configured to convert the analog measuring signal into a digital measuring signal, processing circuitry, wherein the processing circuitry is configured to evaluate the digital measuring signal; and a communication unit configured, during normal operation of the sensor, to transmit a measuring result, produced by the processing circuitry, via the digital communication interface, the communication unit being configured to receive a request for diagnostic data via the digital communication interface, and also being configured to switch the sensor to diagnostic operation and to transmit requested diagnostic data via the digital communication interface during diagnostic operation, wherein the communication unit is configured to communicate with at least two different data rates via the digital communication interface, a data rate used for transmitting the diagnostic data being higher than a data rate for transmitting the measuring result during normal operation of the sensor;
wherein the control unit is configured to request and to evaluate the diagnostic data from the at least one sensor,
wherein the data rate for transmitting the measuring result during normal operation of the sensor is approximately 125 kbit/s, and the data rate used for transmitting the diagnostic data is approximately of 1 Mbit/s,
wherein the higher data rate is used only when a higher transmission capacity is needed.

\* \* \* \* \*